G. F. DEACON.
APPARATUS FOR AUTOMATICALLY REDUCING OR REGULATING FLUID PRESSURE.
No. 192,487. Patented June 26, 1877.
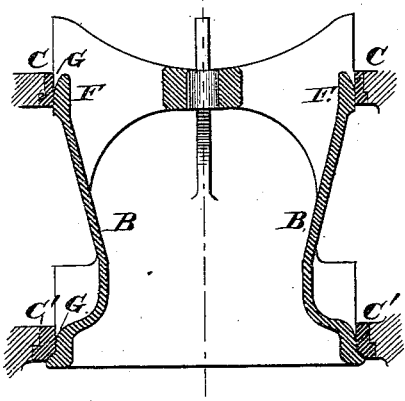
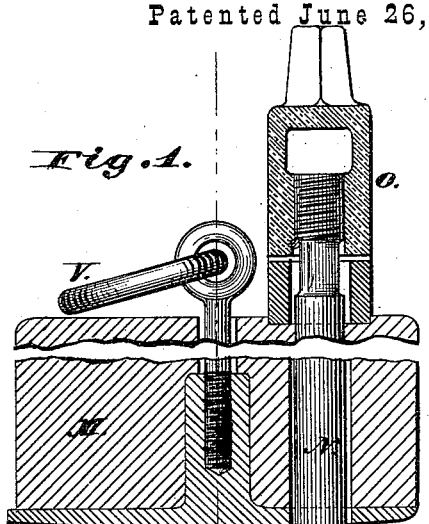
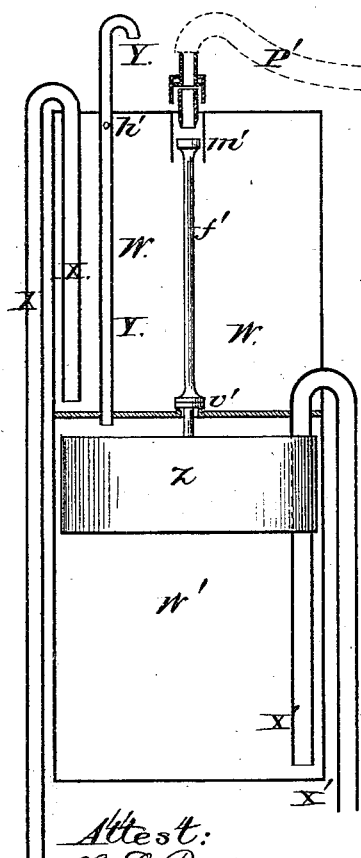
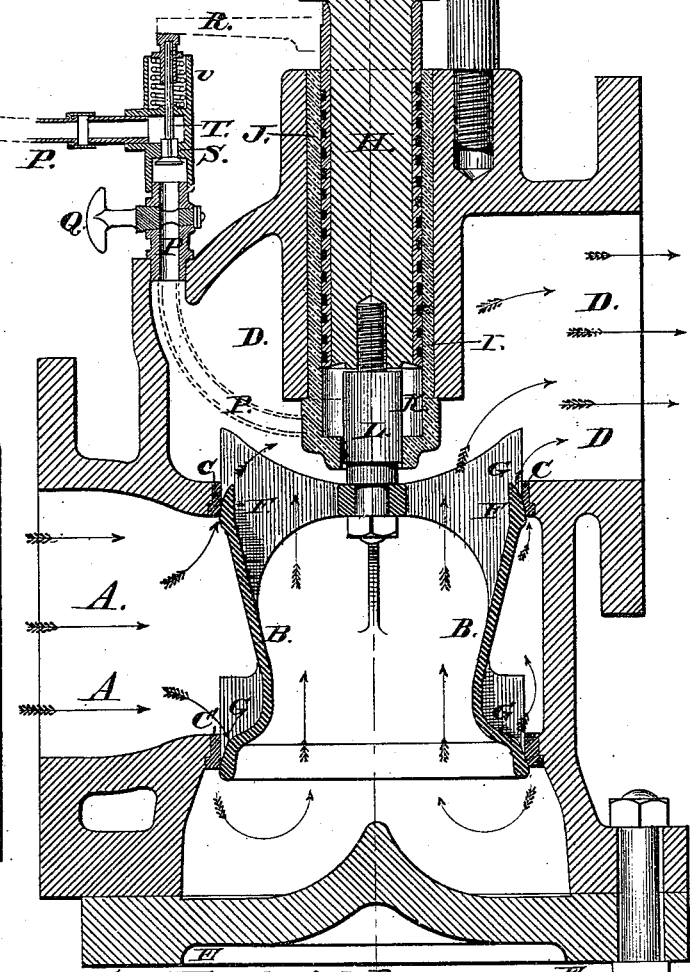
Attest:
H. L. Perrine
J. A. Rutherford
Geo. Frederick Deacon,
Inventor
By James L. Norris, Atty.

UNITED STATES PATENT OFFICE.

GEORGE F. DEACON, OF LIVERPOOL, ENGLAND.

IMPROVEMENT IN APPARATUS FOR AUTOMATICALLY REDUCING OR REGULATING FLUID-PRESSURE.

Specification forming part of Letters Patent No. 192,487, dated June 26, 1877; application filed June 1, 1877.

*To all whom it may concern:*

Be it known that I, GEORGE FREDERICK DEACON, of Liverpool, England, have invented certain new and useful Improvements in Apparatus for Automatically Reducing or Regulating Fluid-Pressure, of which the following is a specification:

My said invention relates to improvements in apparatus for automatically reducing or regulating the pressure of water in water-mains, and some parts of it are applicable to valves for reducing the pressure of steam and other fluids.

The effect of most reducing-valves is to diminish the initial variable pressure to a pressure varying more or less as the initial pressure varies; or if they reduce the initial pressure to a nearly constant resultant pressure, they do so by more complex or costly means than are desirable, while they are generally so constructed that when used for water-works the wear and friction are considerable, on account of the large area of their rubbing-surfaces, between which grit or other foreign matter finds its way.

Further, when used in connection with water-works they are most inconvenient in case of fire, when the highest available pressure is required. The object of my invention is to obviate these objections, and produce a valve of simple construction which will so act that while the velocity of the fluid passing through it may be variable, and also the inlet-pressure—which I call the initial pressure—may be variable, the action of the valve will reduce that pressure to any desired constant or nearly constant pressure, which I term the resultant pressure.

My invention is designed as an improvement on that class of apparatus in which the resultant pressure acts upon a piston or ram capable of moving longitudinally in a cylinder, and held against that pressure by a counter-pressure, which may be either a weight, spring, or other equivalent device, the piston or ram being attached to a balanced valve in such manner that when the resultant pressure on the piston or ram falls short of or exceeds the counter-pressure the piston or ram, being no longer balanced, tends, respectively, to open or close the valve, and thus maintain the approximate constancy of the resultant pressure.

My invention consists in the combination, with the valve and its piston or ram and its weight or counter-pressure, of a subsidiary valve, adapted to be operated automatically by the movement of the ram or piston, for the purpose of automatically operating the balanced valve to fully open said valve to turn on a full head of water, and return the same to its normal position, as more fully hereinafter set forth.

My invention further consists in the combination, with the valve-chamber and its piston or ram, of a siphon-chamber, by means of which the communication from the resultant pressure side of the piston or ram is closed, or the communication from the counter side opened automatically, and by which the valve is caused to reproduce the reduced pressure, after a great or less interval of time, as more fully hereinafter set forth.

In the drawings, Figure 1 represents a vertical section of my improved apparatus, and Fig. 2 a detached view of the balanced valve.

The letter H represents the piston or ram.

In order to reduce the friction to a minimum, the usual stuffing-box or cup-leather may be dispensed with, and instead thereof grooves *i* may be cut in the circumference of the piston or ram, which, as is well known, have the effect of greatly retarding the flow of water, which would otherwise take place between the piston or ram and the cylinder J.

By this device and by the use of the balanced valve hereinafter described, the resistance to motion is so greatly reduced that the counter-weight to spring may be greatly reduced, and need not even be placed at the end of a lever, while the area of the piston or ram, the pressure of water upon which balances the weight or spring, may be reduced in like proportion.

The letters A A represent the inlet or initial pressure-chamber, and B B a section of the double valve shown in Fig. 2. C C are the valve-seats.

When the valve B B is lowered a flow of water takes place past the lower seat, up the trunk, and joins a similar flow from the upper seat to the resultant pressure-chamber D D.

In some cases—as, for example, when it is important to have the inlet and outlet on the same level—it may be convenient to retain the ordinary form of valve with two disks, held apart by an axial spindle, and the parts of my invention, as hereinafter described, are equally applicable in either case.

In order to be enabled to remove the valve without removing a seat, and to permit of the two valve-seats being the same diameter, I cause the valve to be stopped only by one seat, or by some part independent of either seat.

By this device I am enabled to draw out the valve through one of the seats. For example, in the section the valve B B opens downward. Against the lower seat C' C' the valve is stopped, but the upper end of the valve, having no diameter greater than that of the two valve-seats, is capable of being passed out through the lower seat when the cover E E is removed. When, however, the cover is on the side of the chamber from which the valve moves when opening, the valve does not stop against either seat, but instead thereof is caused to stop against some part fixed to the cover, on the removal of which it may therefore be taken out.

In order to make the valve sufficiently tight against the seat which does not stop the valve, I make a cylindrical continuation or portion of it bear, when the valve is closed, closely against the parallel sides of the valve-seat.

Many reducing-valves are liable to produce shocks when changes of velocity take place, and such valves, when used in connection with water-mains, are liable to cause great damage. The shock generally takes place immediately after a diminished flow, and consequent momentary increase of resultant pressure, when the momentum of the valve and parts connected therewith causes it for an instant to close farther than is necessary to keep down the resultant pressure, and thus the flow is suddenly checked.

All valves in which a small rise gives a large water-way are subject to this objection, and where the objection has been overcome the mode adopted has generally involved increased friction. I meet the difficulty, and at the same time retain the advantages of this description of valve, by curving the cylindrical continuation or portion of the valve above spoken of in such a manner that the water-way is contracted and caused to increase at a less rate as the valve is opened than would otherwise be the case. In the diagram, for example, the cylindrical continuations or portions of the valve, which, when the valve is closed, bear closely against the parallel sides of the valve-seats, are shown at F F, and the curved portions, by which the water-way is contracted at an increasing rate as the valve approaches the seats, are shown at G G.

The same object may be attained or assisted by not permitting the resultant pressure to reach the end of the piston or ram, which, as above explained, controls the motion of the valve until after the fluid has been wire-drawn, by having it passed through a small aperture, on the same principle as in the well-known device called a "cataract." In the diagram, such an arrangement is shown at K, Fig. 1. A large portion of the area of the ram is exposed to the fluid in the chamber K, and until part of that fluid has been pressed out through the space between a loosely-fitting piston-rod, L, and the opening through which it passes, or through some other hole, the valve cannot open. Exactly the converse takes place when, owing to an increase of initial pressure, the valve partly closes.

A similar arrangement may evidently be applied at the other end of the piston, and either fluid from the pipe may be used to control the motion or any other fluid—such, for example, as oil or mercury; but in the latter case a separate chamber must be provided for the oil or mercury to be pressed into, so that it may not be lost. The principle in either case is the same as that involved in the device well known as a "cataract."

In the diagram, Fig. 1, the weight which balances the resultant pressure is shown at M. If this weight is increased, the resultant pressure is no longer able to support it by pressing on the ram H and the end of the piston-rod L, and it therefore presses open the valve until the resultant pressure in D D has increased sufficiently to balance it. It is clear, also, that by altering the amount of the weight M or the strength of the spring, or its equivalent, which may be substituted for it, either acting directly or at the end of a lever, any required resultant pressure may be maintained in D D, notwithstanding any change of the initial pressure in A A.

Although under ordinary circumstances a reduced pressure may be required, it may, at certain times, be desirable to revert to the full pressure. In a town, for example, the pressure of water in any distributing water-main should be reduced, under ordinary circumstances, to that pressure which is necessary to raise the water a few feet above the highest houses in the district supplied by that main; but, when a fire takes place, it is most desirable to have the full pressure of water.

I, in some cases, cause the valve to open full, and thus restore the full pressure, by screwing it open with any ordinary fireman's key applied to a spindle provided for the purpose.

In the diagram such a spindle is shown at N, and a nut at O. By screwing down such a nut, the weight or spring, as the case may be, and with it the valve, are pressed down and opened. The same object may similarly be obtained by any equivalent device which, actually or relatively to the fluid-pressure on the piston or ram, gives preponderance to the weight or pressure of the spring. For example, an additional weight may temporarily be allowed to rest upon the normal weight, or upon the spring, of sufficient amount to keep the valve open. Or, if the end of the cylinder farthest from the resultant pressure end be closed and a pipe brought from the main to it, the fluid-pressure in the main may be brought upon that end of the piston or ram by simply opening a subsidiary tap or valve controlling that pipe. The fluid-pressure on the two ends of the piston or ram will then evidently be nearly balanced, and the weight or spring will instantly open the valve. Or, when the end of the cylinder next to the resultant pressure-chamber is closed, in order to wire-draw the fluid before it presses upon the piston or ram, as above described, the weight or pressure of the spring will be increased relatively to the fluid-pressure on the piston or ram, and thus caused to open the valve full by simply opening a communication between the resultant pressure end of the cylinder and the atmosphere. If such a communication be made by a pipe controlled by a subsidiary tap or valve, the opening of that tap or valve will leave the pressure on the two ends of the piston or ram nearly balanced, and the weight or spring will instantly open the valve.

In either of the last two cases the valve may be caused to reduce the pressure as before, by simply closing the subsidiary tap or valve.

In the case of distributing water-mains the flow for the ordinary supply is generally small in comparison with the flow which takes place when a fire occurs in a district. To maintain this increased flow and the resultant pressure for which the weight or spring is adjusted, the valve opens abnormally wide, but still only sufficiently wide to maintain the reduced pressure. I sometimes make use of this exceptional movement to open the subsidiary tap or valve above described, and thus obtain automatically the full pressure of water. In the diagram, for example, at Fig. 1, the desired object is attained by leading the pipe P P from the lower end of the cylinder to the atmosphere. That pipe is controlled by a tap, Q, which, if opened by hand, relieves the pressure on the under side of the piston or ram, and allows the weight to open the valve. If, for the normal supply of the district, the bottom of the weight never reaches the dotted line R, and any movement below that line causes a subsidiary valve, S, to open by pressing upon its spindle T, then, when a fire takes place in the district and water passes through such a reducing-valve to quench it, this abnormally-low position of the weight will be assumed, the subsidiary valve S will be opened, the pressure on the two sides of the ram will be nearly balanced, and the valve will be opened full by the weight. The original condition may be readily restored by closing the tap by hand or by drawing up the weight M by the ring V, when the spring $v$ attached to the subsidiary valve will close it.

But in order to insure this being done, when the fire has ceased I may cause a small quantity of water from either end of the cylinder to flow, when the subsidiary valve or cock is opened, over the footway or into the channel, or into some other conspicuous place, and thus attract attention; but as the flushing of sewers or filling of water-carts may induce an abnormal flow of sufficient velocity to cause the full opening of the valve when not required, it is sometimes important to provide for the automatic return of the valve to the condition in which it reduces the pressure at some reasonable period after it has been thrown out of action. I may effect this when the excessive flow has ceased by making the outlet from the chamber K so far smaller than the inlet that when the pressure has risen higher than the valve before permitted, or than was obtained during the abnormal flow, the pressure in the cylinder against the piston or plunger is greater than that of the weight or spring. The valve then partly closes, and allows the subsidiary valve or cock to be closed by its spring or weight, when the pressure is immediately reduced, as before; but it is generally sufficient to provide that the valve shall open automatically, and remain so until firemen or turncocks have had abundant time to screw it full open by hand, and I provide for this by causing the water from the valve end of the cylinder to flow into a chamber and displace air, which it presses out through a small hole in the upper side of that chamber. When it has filled this chamber, back pressure commences, and the weight is once more raised by the pressure of the water on the piston or ram, and the subsidiary valve closes. Thus, at the end of the time required to fill the chamber, the normal condition is restored.

The chamber may be allowed to empty slowly by a small hole in its lower side; or, by means of a float, the rising water may be caused to actuate a valve on the communication-pipe, and thus produce back pressure, in which case a siphon may be arranged to empty the chamber quickly.

A convenient mode of arranging such a chamber, and of increasing the period before it resets the valve, without making it inconveniently large, is shown in Fig. 1, where the pipe P is continued, as at P', to the upper side of a chamber divided horizontally into two parts. The water from the pipe P having filled the upper division, W, and pressed air out by the holes at $h'$ in the tube Y, passes out by a siphon, X; but when on the point of doing so a few drops flow through the holes at $h'$ in the tube Y to the lower division, W'. Thus each time the upper division is filled and emptied the lower division receives a small quantity of water. The water in the lower division having, after a greater or less interval of time, nearly raised the float Z, the next charge, which takes place when the upper division is full, raises the float Z, and with it the stem $f'$. At the top of this stem is a valve, $m'$, which, when thus raised, closes against a seat at the end of the pipe P', thus causing back pressure beneath the piston or ram, and resetting the reducing-valve; but at the same instant that the stem $f'$ is raised a valve, $v'$, carried by that stem, is opened, and the full charge of water in the upper division, W, seeks to enter the lower division, W'. The siphon $x'$ is thus started, and by emptying the chamber sets it in order for the next occasion.

An arrangement of a similar kind, but modified in detail, may be caused to reset the valve automatically when the automatic opening is produced by bringing water-pressure to bear upon the counter side of the piston or ram. In such a case a small flow of water from the counter side of the piston or ram enters the chamber, and after a time opens a subsidiary valve, which relieves the water-pressure on the counter side. The resultant pressure then partly closes the equilibrium-valve, and the communication between the counter side of the piston or ram and the main is shut off by the release of the spring or weight of the subsidiary valve, as before.

What I claim, and desire to secure by Letters Patent, is—

1. The combination, with the double-seated valve-chamber, of the cylindrical equilibrium-valve provided with two annular bearing-surfaces, said surfaces being curved, as described, for the purpose of contracting the water-way at an increasing rate as the valve approaches its seats, whereby shocks are prevented, substantially as described.

2. The combination, with the ram and its weight or spring, of the auxiliary valve and valve-chamber connected with the chamber below the ram, for automatically balancing the pressure on the two ends of the ram, in order to allow the weight or spring to automatically operate the auxiliary valve to open the main valve, substantially as described.

3. The combination, with the chamber K below the ram, of the chambers W W' communicating with each other, the valves $m$ $v$ on a common valve-rod provided with a float, Z, the tube Y provided with an opening, $h'$, and the siphon X $x'$ leading from the respective cylinders, the whole constructed and arranged substantially as and for the object described.

In testimony that I claim the foregoing I have hereunto set my hand in the presence of the subscribing witnesses.

GEORGE F. DEACON.

Witnesses:
 J. H. LAWLER,
 WM. KELLY,
  Clerks to Ievons, Riley & Style,
   Solicitors, Liverpool.